US008097166B2

(12) United States Patent
Nakashima

(10) Patent No.: US 8,097,166 B2
(45) Date of Patent: Jan. 17, 2012

(54) METHOD TO PRODUCE THE ACTIVATED LIQUID WHICH CONTAINS MICRO GAS BUBBLES AND METHODS REALIZED BY THE USE OF THE LIQUID

(76) Inventor: Takeshi Nakashima, Morioka (JP)

( * ) Notice: Subject to any disclaimer, the term of this patent is extended or adjusted under 35 U.S.C. 154(b) by 1889 days.

(21) Appl. No.: 11/090,081

(22) Filed: Mar. 28, 2005

(65) Prior Publication Data

US 2006/0027504 A1 Feb. 9, 2006

(51) Int. Cl.
*C02F 1/48* (2006.01)

(52) U.S. Cl. ..................... 210/695; 210/222; 210/221.2; 210/416.1; 261/75

(58) Field of Classification Search .................. 210/695, 210/222, 221.2, 416.1; 261/75
See application file for complete search history.

(56) References Cited

U.S. PATENT DOCUMENTS 3,631,985 A 1/1972 Taeger
3,680,705 A * 8/1972 Happ et al. .................... 210/222
4,519,919 A * 5/1985 Whyte et al. .................. 210/695
5,468,378 A * 11/1995 de la Torre Barreiro ...... 210/222
5,942,161 A 8/1999 Pate
5,948,326 A 9/1999 Pate

FOREIGN PATENT DOCUMENTS

JP P2003-53373 A 2/2003

* cited by examiner

*Primary Examiner* — David A Reifsnyder

(57) ABSTRACT

This invention offers effective and efficient method to produce and to use LIQUID defined as activated liquid which contains sufficient amount of micro bubbles of diameter less than 10 micrometers. LIQUID exhibits very useful properties for the purification of liquid, sterilization, extinguishment of undesirable bubbles, preservation of freshness of food, storage of gas in liquid, the decomposition of pollutants etc. The method to produce LIQUID comprises a means to rotate a rotor installed in a fixed tube wherein the rotor and the fixed tube are provided with a set of permanent magnets and a set of linear protuberances, and liquid and gas are introduced in the gap formed between the fixed tube and the rotor by pumping means driven by the motor. The micro bubbles are effectively produced with the repulsive magnetic field generated by the S (or N) pole of at least 30% of the whole magnets faced with the said gap. An annular activator made from far infrared emitting materials is assembled in the path of liquid in order to increase the efficiency for producing LIQUID.

6 Claims, 5 Drawing Sheets

METHOD TO PRODUCE THE ACTIVATED LIQUID WHICH CONTAINS MICRO GAS BUBBLES AND METHODS REALIZED BY THE USE OF THE LIQUID

BACKGROUND OF THE INVENTION

This invention relates to method to produce activated liquid, which contains micro gas bubbles, and also the method to produce activated liquid, which contains micro gas bubbles in the form of droplets and or mist, and is applicable to the purification of the liquid in polluted seas, lakes and marshes, dams, rivers etc., or drinking water, industrial water, cooling water and waste oil discharged from factories and gas stations etc., the cleaning and sterilization of food, i.e. agricultural and aquatic products, medical treatments, the extinguishment of undesirable bubbles, the preservation of freshness of food and the storage of gas such as hydrogen, carbon dioxide, methane etc., in liquid.

In addition to the known characteristics of water purification, micro gas bubbles, that are defined to have diameter less than 10 micrometers contained in activated (ionized) liquid, were experimentally found by the inventor of the present invention to exhibit novel characteristics such as the extinguishment of larger bubbles especially those existing in viscous liquid, the storage of hydrogen, carbon dioxide and methane etc., the preservation of food, vegetables and meat for longer period, sterilization, medical treatment, safer and more efficient spray for fire extinguishment, moistening, manure, fertilization of soil, and more efficient purification of polluted liquid taking advantage of enlarged contact area of micro gas bubbles with liquid, decrease in surface tension, generation of hydroxyl ion and micro clusters caused by the activated liquid which contains micro gas bubbles. The purpose of the present invention is to offer new and more effective method to produce the activated liquid which contains gas bubbles useful for the application mention above. The equipment to produce liquid containing minute bubbles of diameter not less than 10 micrometers has been used for the purification of polluted water and was disclosed in Japanese patent application P 2003-53373A published in Japanese unexamined patent application bulletin. This equipment was invented by the same inventor as that of the present invention. The equipment is preferably used for the purification of the liquid in polluted seas, lakes and marshes, dams, rivers etc. The purification equipment described in this prior invention comprises, as shown in FIG. 10, rotor 25 which is installed inside fixed tube 21 and rotated by motor 23, liquid inlet 27 and gas inlet 29 assembled to the wall of fixed tube 21 near one of its ends, stirrer 6 which mixes liquid with gas at first, connecting chamber 31 connected to the other end of the fixed tube, and a pumping means 33 driven by the motor, a plurality of permanent magnets 35 and 37 mounted on the top surface of a plurality of linear protuberances 45 and 47 having normal trapezoidal section, top section is shorter that that at bottom, provided on the inner surface of fixed tube 21 and outer surface of rotor 25 respectively, or in a plurality of grooves formed between adjacent two linear protuberances on the inner surface and/or on the outer surface, respectively. While rotor 25 is rotating, liquid and gas are made to flow into fixed tube 21 through inlets 27 and 29 due to flow into fixed tube 21 through inlets 27 and 29 due to pressure reduction in the gap between fixed tube 21 and rotor 25 caused by pumping the liquid out of connecting chamber 31 to the exterior of the equipment. The liquid and gas introduced into fixed tube in this way are at first mixed mechanically with each other by stirrer 6 and introduced to the gap formed between the inner surface of the fixed tube and the outer surface of the rotor. The liquid first mixed with the gas is then shared, activated, and mixed simultaneously and instantly by the reaction with magnetic field and the intense vibration caused in the liquid when the flow of liquid and gas passes the gap between zigzag surfaces, mutually moving in the direction of circumference, formed with the plurality of permanent magnets and the plurality of linear protuberances on each surface of fixed tube 21 and rotor 25, and finally activated liquid, which contains plenty of minute bubbles is produced. The liquid, which is activated and contains plenty of gas bubbles in this way, is pumped out to the exterior by means of the pumping means 33 and purifies liquid in exterior source. Although the prior equipment has been successfully used to recover good water environment, further improvement is required for more efficient performance and for wider range of applications.

The present invention is also related to technology to decrease or extinguish harmful bubbles generated in the process of industrial production, environmental treatment, the treatments of industrial wastes and so on.

The present invention is further related to method to produce the liquid which is activated liquid and contains micro bubbles of specific gases for the purpose of sterilization, preservation of freshness, moistening, fire extinguishment, manure, improvement of crumbled structure and exchangeable cation of soil and the like.

SUMMARY OF THE INVENTION

This invention offers the methods to produce activated liquid which contains micro bubbles and the liquid in the form of droplets or mist. Hereafter, the activated liquid which contains micro bubbles is designated by LIQUID.

1. Method to Produce LIQUID 1.1 Basic Method to Produce LIQUID.

This invention offers new and more efficient method than that disclosed in the prior invention in order to produce LIQUID by means of far infrared radiation generated by at least one annular activator and/or by means of repulsive magnetic field generated by at least 30% of the pairs of permanent magnet assemblies.

FIG. 1 is a schematic diagram to explain an example of an embodiment of the present invention. Liquid and gas are introduced from exterior sources through at least one liquid inlet 27 and gas inlet 29 which are mounted to the wall near an end of fixed tube 21, respectively in a gap between fixed tube 21 and rotor 25. While rotor 25 is rotated by motor 23, the liquid and gas are rapidly mixed with each other by a plurality of rotating linear protuberances 47 and a plurality of magnets 37 provided on the surface of the rotor; and another plurality of fixed linear protuberances 45 and another plurality of magnets 35 provided on the inner surface of fixed tube 21. When the S pole (or N pole) of the magnet 35 is faced with the same S pole (or N pole) of the magnet 37, it is experimentally confirmed that the diameter of the bubbles become smaller than 10 micrometers, comparing with other cases of configuration of the magnets. When liquid is water and gas is air, best result was obtained with S poles faced with each other. In this way, liquid and gas are mixed, activated and converted into LIQUID during the passage of liquid and gas flow through the gap, of which section is rapidly and repeatedly changing in shape. Although it is desirable to make all S (or N) poles faced with each other to increase the population of micro bubbles, 30% will be satisfactory depending upon the object of operation. Then, LIQUID is pumped out by pumping means 33 to exterior.

An annular activator 81 made of magnetic material which contains far infrared emission material, such as germanium in between metallurgical phases, is placed between the inlets and stirrer 6.

1.2 Method to Produce Specific (Functional) LIQUID

Specific (functional) water that exhibits specific effect, such as hydrogen water, oxygen water etc. has been known. The present invention offers the method to produce specific LIQUID wherein water is supplied through the liquid inlet and gas such as hydrogen, oxygen, ozone, nitrogen carbon dioxide or the mixture of these gases is supplied through the gas inlet.

1.3 Method to Produce LIQUID in the Form of Droplet

As LIQUID is pumped out from the connecting chamber, droplets of LIQUID are produced by supplying LIQUID to foggers or sprayers connected with at least one outlet assembled to the wall that covers tightly the opening of the connecting chamber.

2. New Applications Realized by LIQUID 2.1 Extinguishment of Stubborn Bubbles

It has been newly found that LIQUID can extinguish harmful bubbles generated in liquid in the process of industrial production, environmental treatment, treatment of industrial wastes etc., simply by supplying the liquid through the liquid inlet and mixed with air by the method of the present invention.

DETAILED DESCRIPTION OF PREFERRED EMBODIMENTS

1. Method to Produce LIQUID

The present invention is related to the production and the usage of LIQUID that was previously defined as "astivated liquid which contains sufficient amount of micro bubbles of diameter less than 10 micrometers". Comparing with the prior invention by the same inventor, more effective and more applicable method is developed in the present invention.

Figure 10:
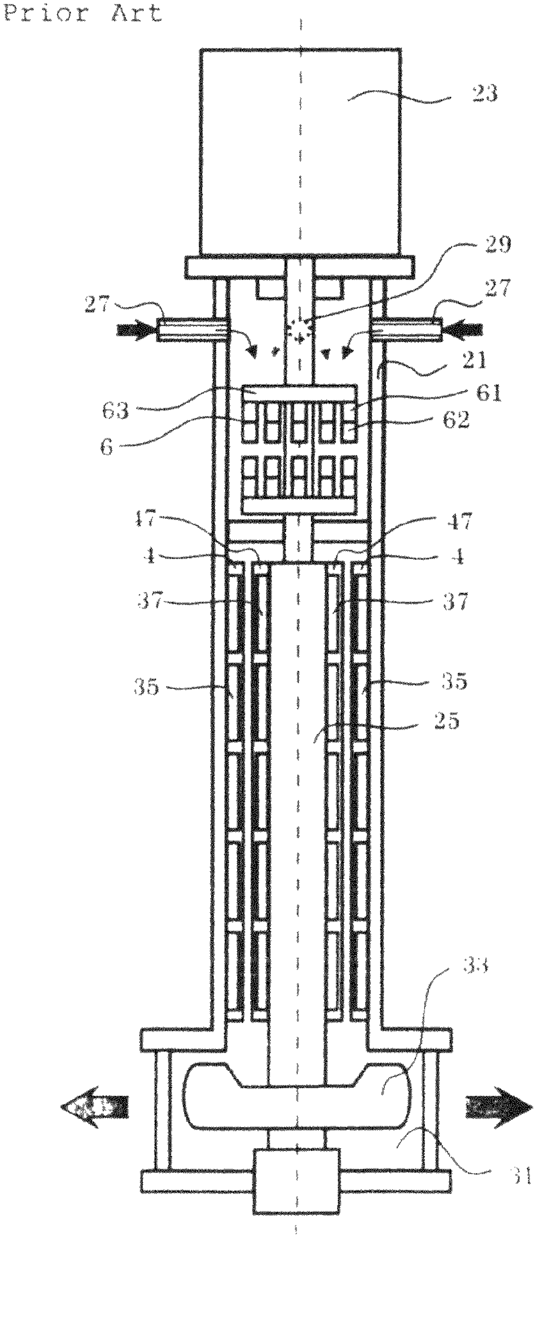
Fig. 10 Prior Art
FIG. 10 is a schematic diagram of one of the examples to show prior technology of the equipment to produce activated liquid containing minute gas bubbles.
Figure 1:
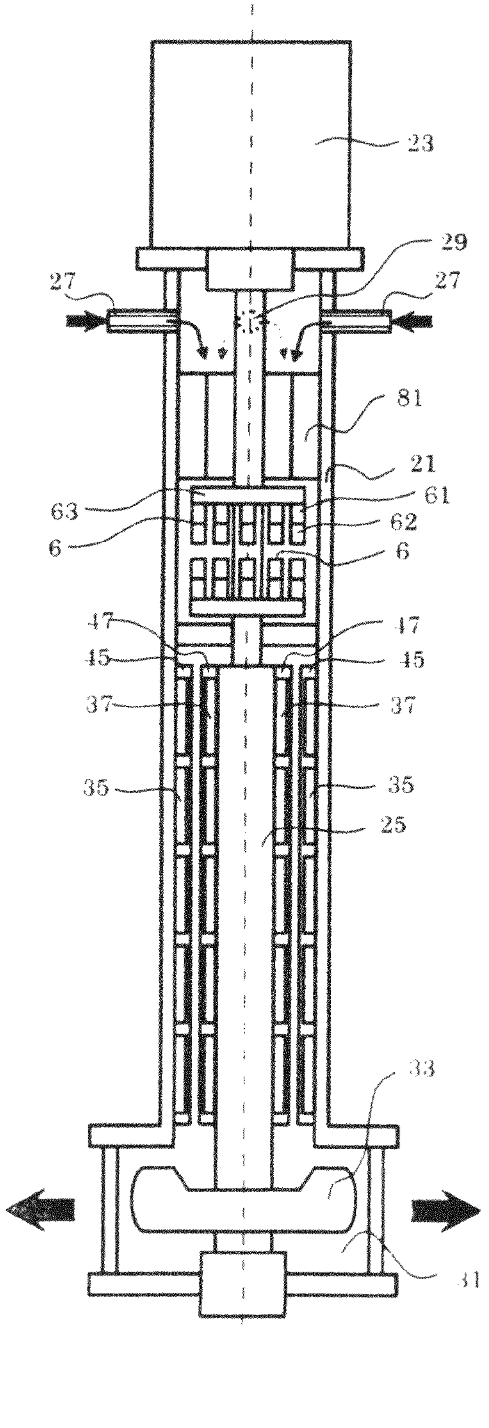
FIG. 1 is a schematic diagram of one embodiment of the present invention of the equipment used in the method to produce liquid containing micro bubbles.
Figure 2:
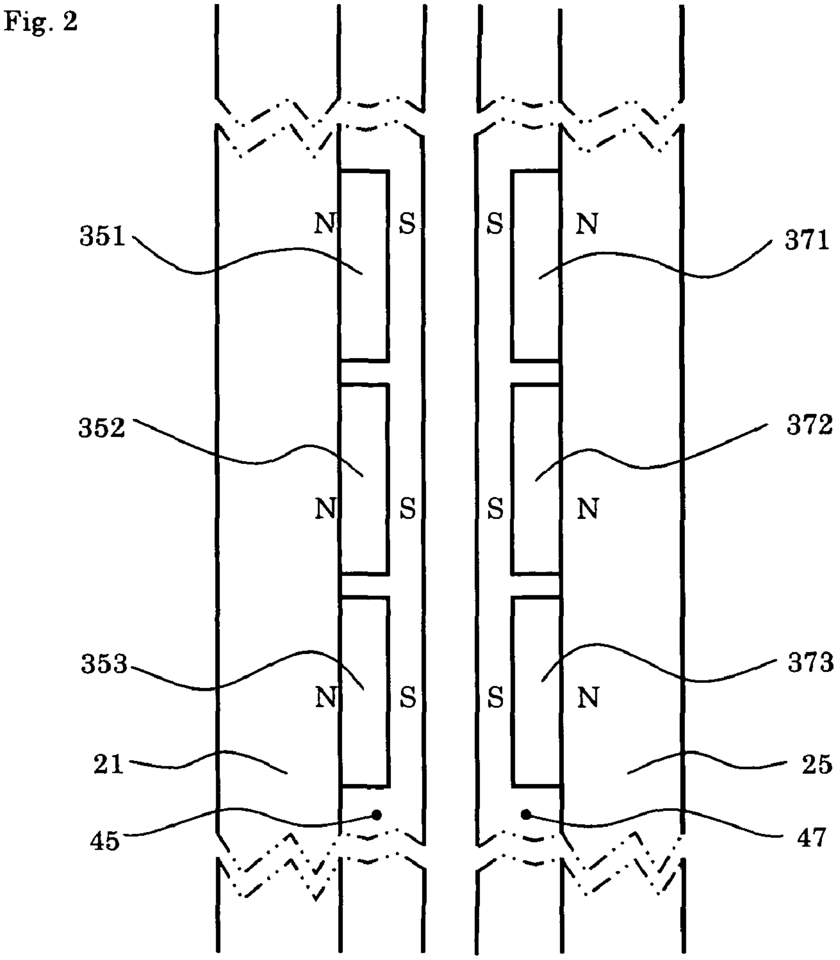
FIG. 2 is a schematic diagram of one example of basic magnetic pole assemblies of the permanent magnets mounted on fixed tube 21 and rotor 25.
Figure 3:
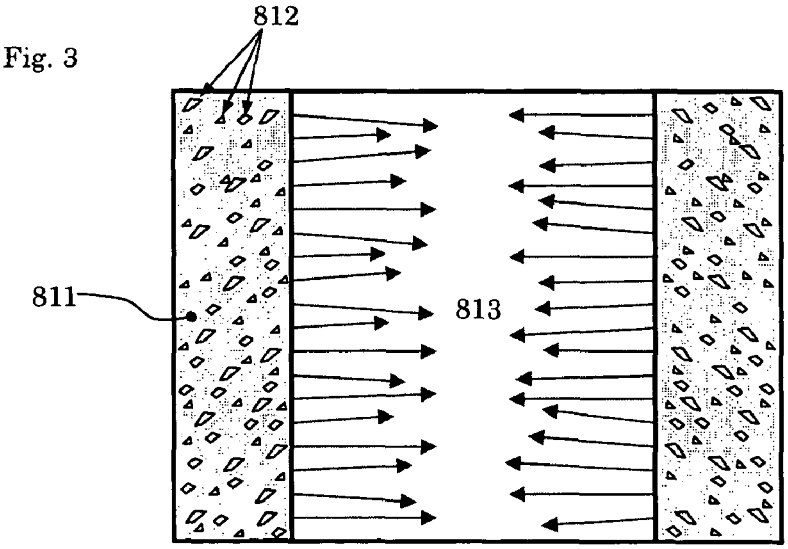
FIG. 3 is a schematic diagram of an example of annular activator.
Figure 8:
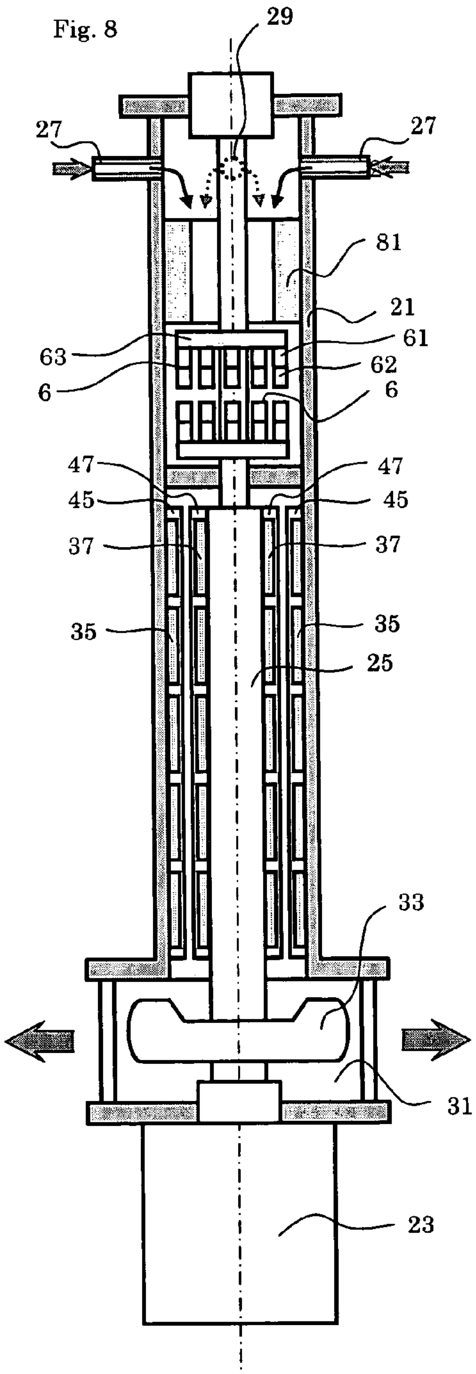
FIG. 8 is a schematic diagram of another embodiment of the present invention on the equipment to produce activated liquid containing micro bubbles wherein motor 23 is mounted at the bottom of the equipment.

As shown in FIG. 1, the equipment to produce LIQUID comprises, additionally to the equipment which is already mentioned in relation to FIG. 10, annular activator 81 as shown in FIG. 3 which is already mentioned in relation to FIG. 10, annular activator 81 as shown in FIG. 3 which is comprised of far infrared emission material 811 and assisting material 812 such as germanium in between metallurgical phases emits infrared radiation 813 to activate molecular oscillation of the liquid molecules, and placed between the inlets which can be made from the same material as the annular activator or other material and stirrer 6; and a plurality of permanent magnets 35 and 37 which have their south S poles positioned towards the gap between the fixed tube 21 and the rotor 25 as shown in FIG. 2 to produce powerful and rapid variation in the magnetic field when the rotor is rotating that results in activated micro liquid clusters due to the electrolysis caused by rapid change in the magnetic field. The stirrer 6 is composed of a circular plate 63 fixed to the rotor axis, and a set of rods made of ceramic and magnets 62, for mixing liquid and gas to generate ion flow while it is rotating. In FIGS. 1, 2, and 8 two sets of stirrers are used.

When liquid flows through the inner portion of the activator, molecules of the liquid absorb resonantly energy of the far infrared radiation 813 that is emitted by the emission material even at low temperature. The molecular vibration of the liquid prevents foreign magnetic particles from attaching to the surface of the sets of magnets mounted on the fixed tube 21 and rotor 25. Performance of the equipment is further improved to guarantee longer life of operation by preventing the deterioration of the magnets otherwise possibly caused by foreign magnetic matters. Especially when the liquid is water, oxygen molecules are taken in water due to hydration, and adsorption of positively ionized air into oxygen atoms of water molecules and also negatively ionized air molecules into hydrogen atoms of water molecules are accelerated. Thus, the annular activator can accelerate and double the effect of activation undergone in the gap formed between the fixed tube and the rotor.

Figure 4:
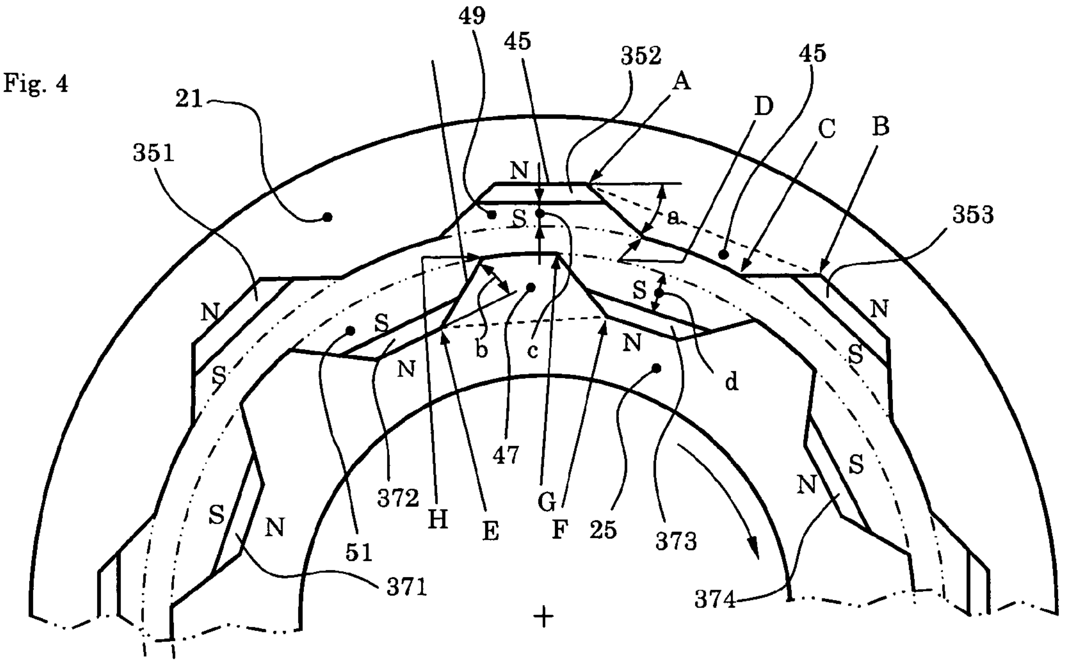
FIG. 4 is a schematic diagram representing half cross section of fixed tube 21 and rotor 25 at a portion of each linear protuberance perpendicular to the axis of the rotor where a plurality of magnets are mounted in the groove formed by two adjacent protuberances formed on both the fixed tube and the rotor.

FIG. 2 schematically shows a portion of an example of a pair of magnet assemblies on a plane including axis of rotation and FIG. 4 a half sectional view perpendicular to the rotation axis. The south pole of each magnet is designated by S and the north pole of each magnet by N. Permanent magnets 351, 352, 353, etc., which are called a set of permanent magnets if necessary to discriminate each other, are mounted on the top surface of a set of linear protuberances 45 having trapezoidal section ABCD formed on the inner surface of fixed tube 21 or in a set of grooves 49 formed by two adjacent protuberances. Permanent magnets 371, 372, 373 etc., which are called a set of permanent magnets 37 if necessary to discriminate from each other are mounted on the top surface of a set of linear protuberances 47 having trapezoidal section EFGH formed on the outer surface of rotor 25 or in a set of grooves 51 formed by two adjacent protuberances.

As shown in the Figures, all the S poles are faced towards the gap between fixed tube 21 and rotor 25. When two magnets are faced with the same magnetic poles towards each other magnetic fields of the magnets repulse each other and two strong fields are formed in the gap. This gives a strong electromagnetic effect on the physical and chemical state of the liquid corresponding to the field strength, so that the liquid is electromagnetically activated, divided into smaller clusters and micro gas bubbles are generated. When the poles of a set of magnets is reversed, the magnets pull each other and magnetic field becomes rather smooth and peak value is lower than the former case. In other words activation of the liquid becomes fairly weak and strong effect does not take place.

When the rotor is rotating, a repulsive magnetic field is generated in the gap between the fixed tubes and the motor changes rapidly corresponding to the rotation of the rotor. While the liquid and gas flow through the gap, they are mixed with each other very rapidly due to the mutual rotation of the two zigzag surfaces as a section of them are shown in FIG. 4, and activated by strong magnetic field. It gives random magnetic and also mechanical change at high frequencies to the liquid flow and results in the generation of activated micro clusters and micro bubbles. As a result of this effect, LIQUID is produced.

For the efficient production of LIQUID, angle a of side surface AD with respect to the corresponding groove of the fixed tube and that b of side surface EH with respect to the corresponding groove of rotor 25 preferably made to a value between 20 to 60 degrees, and depth d between the top surface of protuberance 45 and the top surface of the magnet 35 is made larger than that of c between the top surface of protuberance and the top surface of the magnet 37 in FIG. 1. It is to be noted that water flow is sheared depending on the difference in flow speed caused by the difference in the depth of concave portion of the surface of the fixed tube and the rotor, so that d could be less than c.

As for linear protuberance in this invention, linear means not only straight but also curved or spiral.

Figure 5:
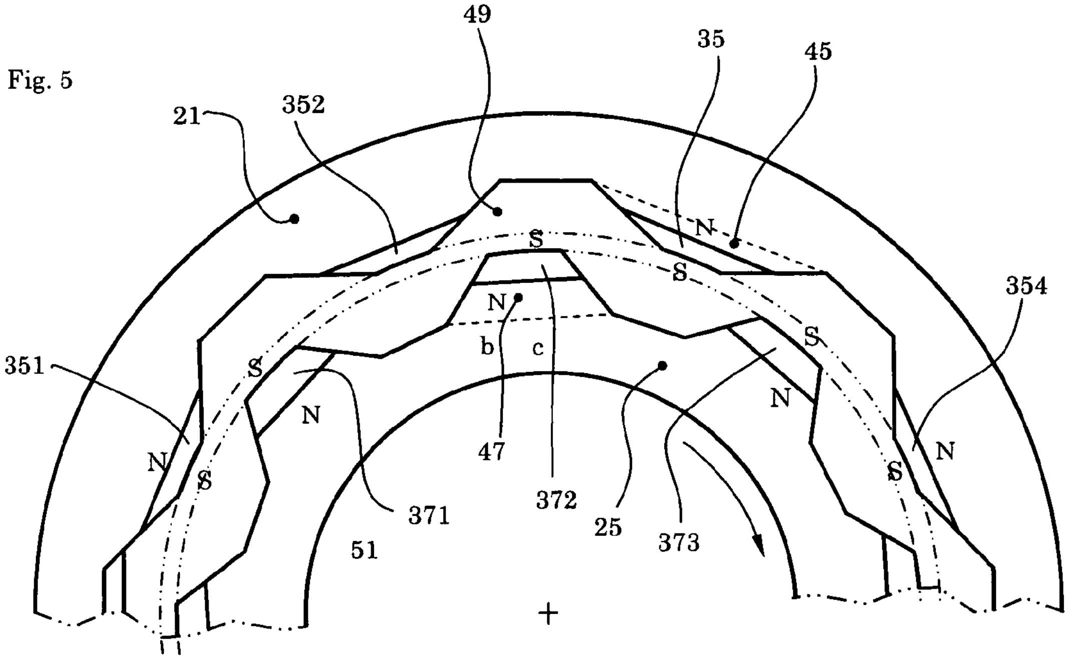
FIG. 5 is a schematic diagram representing half cross section of fixed tube 21 and rotor 25 at a portion of each linear protuberance perpendicular to the axis of the rotor where a plurality of magnets are mounted on the top surface of a plurality of linear protuberances formed on both the fixed tube and the rotor.
Figure 6:
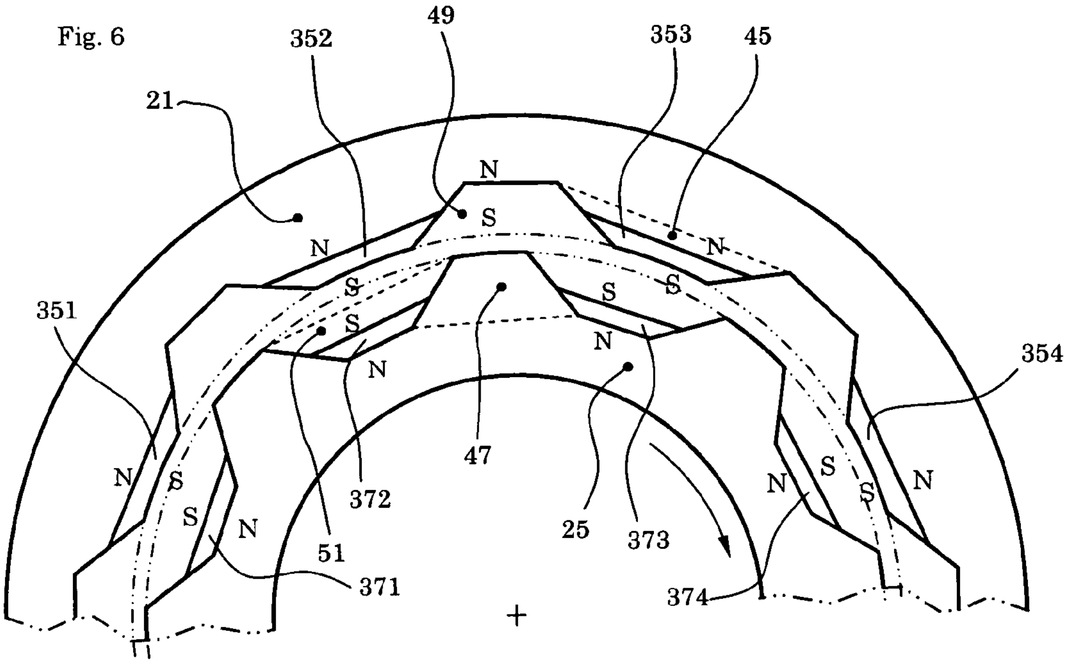
FIG. 6 is a schematic diagram representing half cross section of fixed tube 21 and rotor 25 at a portion of each linear protuberance perpendicular to the axis of the rotor where a plurality of magnets are mounted on the top surface of a plurality of linear protuberances formed on the fixed tube and a plurality of magnets are mounted in the groove formed by adjacent two protuberances formed on the rotor.
Figure 7:
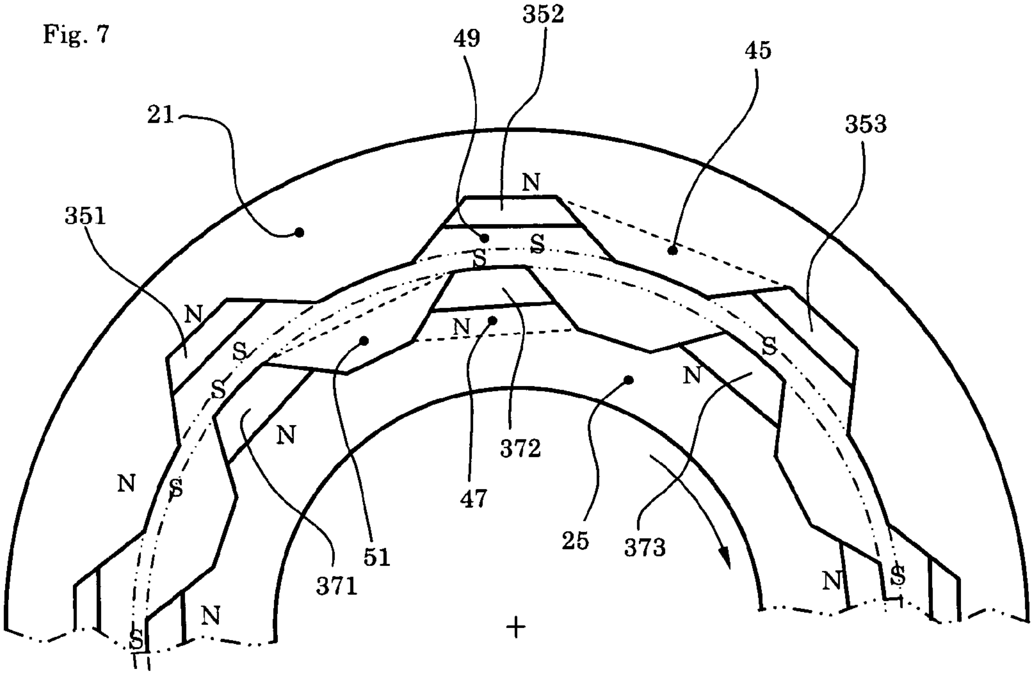
FIG. 7 is a schematic diagram representing half cross section of fixed tube 25 at a portion of each linear protuberance perpendicular to the axis of the rotor where a plurality of magnets are mounted in the groove formed by adjacent two linear protuberances formed on the fixed tube and a plurality of magnets are mounted on the top of a plurality of linear protuberances formed on the rotor.

There are variations in the positional relation between the set of magnets and the set of linear protuberances, that is, a whole set of magnets are mounted on the top surface of a whole set of protuberances as shown in FIG. 5, a set of magnets is mounted on the top surface of protuberances formed on the inner surface of fixed tube 21 and another set of magnets is mounted in a set of the grooves formed on rotor 25 in FIG. 6 and vice versa in FIG. 7.

FIG. 8 shows another embodiment of the present invention. Motor 23 is installed at the bottom of the equipment. There is no difference in substantial functions as mentioned above.

It was experimentally found using laser scattering measurement that the equipment operated at the rotating speed of 1500 rpm to produce 40% of bubbles being in the diameter range of 5 to 10 micrometers, and 20% in 2 to 3 micrometers. A change in pH caused by the diffusion of water ion was observed. It proved the production of micro bubbles. Moreover, it was found that activated bubbles less than 10 micrometers can stay stably much longer in liquid, causing the increase of the probability to activate the liquid atoms and molecules, resulting in increase in dissolved oxygen leading to faster and more efficient purification. It was found by an advanced microscope method that the peak population of bubbles in 6M and located at 1.2 micrometers in diameter and the diameter of bubble is distributed in the range less than 2 micrometers when water and gas are mixed.

Characteristics of LIQUID and LIQUID in the form of droplets or mist LIQUID and LIQUID in the form of droplets or mist are characterized by (1) LIQUID mainly composed of activated liquid wherein gas is dissolved and micro bubbles of diameter less than 10 micrometers containing the same kind of gas.

(2) LIQUID mainly composed of activated liquid wherein specific gas such as hydrogen is dissolved and micro bubbles of diameter less than 10 micrometers containing the same kind of gas.

(3) Any kind of gas can be used for LIQUID. However, air, oxygen, ozone, nitrogen, carbon dioxide or hydrogen, or mixture of these gasses can be preferably used.

LIQUID exhibits the following effects

A. Increase in the contact area between liquid and gas. As the diameter of a bubble decreases, the total surface area of the bubbles of the same diameter increases. It implies that reaction speed becomes much faster if bubbles of smaller diameter are used.

B. Decrease in surface tension. Looking at water molecules, each molecule always moves randomly as expressed in Brownian linear and rotational movement and also repeats elastic collisions. As the surface tension decreases, bubbles break during sedimentation affected by Brownian movement and dissolved oxygen increases. The life of bubbles becomes longer and they move in regular flow as transversal wave does.

C. Electrolysis. Due to the reaction with magnetic field, water molecules are ionized to generate hydroxyl ions, and clusters are divided into smaller ones having sterilization and cleaning effect. In addition spin motion of water electron is induced and deoxidization takes place.

D. Regulated molecular movement caused by magnetic field. Molecular movement is regulated to rotational one in a direction and chance to react with other molecule decreases.

E. Sterilization and preservation of food. When micro bubble disappears, H ion, OH ion and H3O2 ion are developed and destroy virus. Bacteria are destroyed by decrease in oxidation and reduction potential, surface tension, and osmotic pressure. As the micro bubbles are charged with minus potential, bacteria usually charged with plus potential die caused by the exchange of ions. The bacteria of prokaryotic cells are killed selectively due to ion exchange and potential difference caused by penetration of minus ion. Those of eukaryotic cells are not affected. Bladder of blue-green microbe is destroyed by minus ion and then the microbe dies. Micro bubbles selectively react with and kill bacteria having plus ion. As good microbes have minus ions, the bubbles give no effect to them. The color of an agricultural product changes when its solution has potential and is oxidized in air. Freshness of food is preserved by preventing it from oxidation by ion exchange between ion in the lixivium and minus ion charged to LIQUID.

F. LIQUID having new function. By the method disclosed in the present invention, drinking hydrogen water or oxygen water having less oxidation and reduction and long dissolving period can be produced by dissolving hydrogen or oxygen in the gap of water molecules respectively caused by powerful self compression mechanism of bubbles.

G. Storage of gas in the form of hydrate. Hydrate is the compound which is composed of gas molecules taken in a cage formed by water molecules. Gasses to cause global warming, such as carbon dioxide, nitride, methane, CFC, HCFC, HFC etc. form hydrate when they are mixed with water. Micro bubbles are partly characterized in that they dissolve the gas inside liquid until they disappear in the liquid, because of totally larger surface area and the effect of the increase in pressure inside. Gas hydrate is generated by taking advantage of the compressibility of micro bubbles, that is, pressure inside of the bubbles is higher than the surrounding. Bubbles become smaller as the gas is dissolved in liquid. However, the pressure becomes higher as bubble diameter decreases because of the increase in surface tension corresponding to the decrease in bubble diameter and reaches critical pressure where nucleus of hydrate is generated in the surrounding liquid. Once hydrate starts to be generated, it continues to grow. Storage of the warming gas can be done without the equipment of big scale and heavy investment based on the method disclosed in this invention. The pressure necessary for the generation of hydrate is less than that of saturated vapor of warming materials so that this invention offers economic means with lower energy for the separation of the hydrate from liquid.

H. Purification of water environment polluted by PCB and/or dioxin, removal of bad smell and decomposition of volatile organic compound. When dirty and muddy water is made to move randomly and to flow in magnetic field, metal ions are spread and increase thermal energy of water molecules and metal ions attracting water molecules. By these cooperative effects, high temperature is developed in local areas on the boundary surface of micro bubbles. The high temperature areas diffuse and contact with PCB. PCB is then decomposed with the high temperature. In the equipment based on the method disclosed in the present invention LIQUID is powerfully and rapidly stirred and supplied with energy of compression and expansion and also rotation. PCB moves to boundary surface of bubbles because of the effect of shedding water and electric field, and is decomposed caused by the energy of molecular oscillation in the boundary. Even if PCB is caught in a group of water molecules, electro-magnetic field and metal ion accelerate molecular movement of polluted water and as a result it becomes easy to separate PCB from water. As metal ion such as Mg, Na, K which have excellent property for the removal of chlorine that exists in the PCB, chlorine is pulled off the substances when they meet with one of the ions. Combined with these effects, benzene rings of PCB are broken and discomposed into carbon dioxide and chlorides. Smell and volatile material are introduced in the equipment based on the present invention and made dissolved in water and decomposed by the effect of oxidation and reduction, and also decomposed by the energy of molecular oscillation in local areas developed by the reaction of randomly and rapidly moving water flow with electro magnetic field in the same way as PCB.

2. Method to Use LIQUID.

2.1 Method to Extinguish Bubbles. 1. Extinguish of Bubbles.

By the use of LIQUID, the present invention offers new and low cost method to extinguish the bubbles, without additive, which gives harmful effect in industrial process, such as in chemical, polymer of ferment plant.

In conventional physical-mechanical techniques, expensive and energy consuming equipment is required to give pressure, heat or vibration to a large volume of liquid needed for the extinguishment. In chemical extinguishment, additive is necessary and increases cost. Additive is not applicable when it is undesirable to use.

It is experimentally found that group of stubborn bubbles in polymer emulsion disappeared in a short time when equipment to produce LIQUID is operated. Although the phenomenon has not been fully understood, it is estimated that the surface tension of the liquid around them is caused to decrease by LIQUID and liquid around smaller becomes more viscous and the larger bubbles can not sustain themselves, and are broken when stable bubbles produced by the equipment collide with them. All that is needed is simply to place and operate the equipment in the liquid to extinguish bubbles and nothing else is necessary. The equipment that can be used for the extinguishment is any one capable of generating micro bubbles less than 10 micrometers in diameter.

Figure 9:
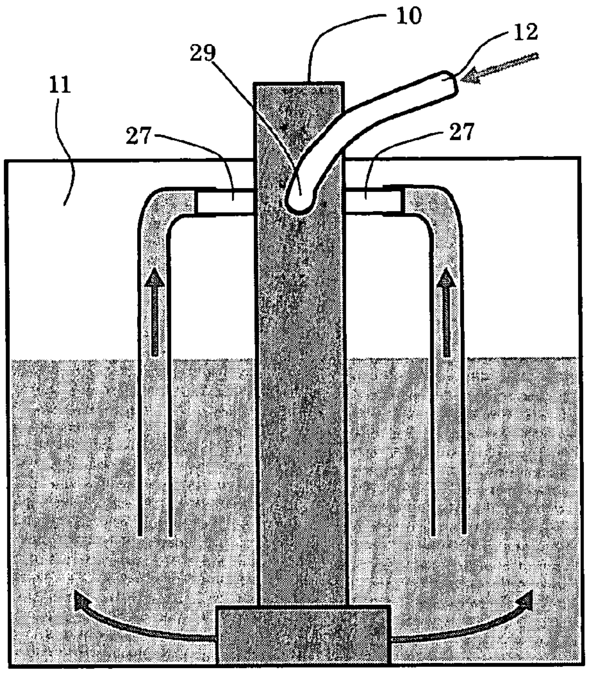
FIG. 9 is a schematic diagram to show the method realized by the application of the present invention to extinguish stubborn bubbles.

FIG. 9 is a schematic diagram to show the basic concept of the method for the extinguishment of bubbles. It is good enough to place the equipment 10 together with supporting means at the bottom surface of the container 11 where liquid to be treated for extinguish of bubbles is contained and to operate the equipment by bringing soft tube 12 connected to the air inlet 29 above liquid surface.

The present invention is also related to the production of LIQUID in the form of minute droplets or mist for the purpose of sterilization, moistening, fire extinguishment, manure, improvement of crumbled structure and exchangeable cation of soil etc. by the use of LIQUID.

Magnetic treatment of liquid especially of water has attracted a great deal of interest. Although reason is not fully found yet, the treated water shows unique characteristics such as increase in penetration capability, protection or removal of the rust caused by ferrous metals and prevention of attaching calcium carbonate to the wall of pipe.

On the other hand, as the technology to minimize bubbles with the present invention has greatly advanced, it becomes clearer by the experience of the inventor that the micro bubbles show characteristics remarkably different from that of larger bubbles. As mentioned previously, for example the bubbles are stable and stay in water for a long period without floating or dispersing and water containing oxygen bubbles becomes more active to bacteria or microbes.

At present, LIQUID has been applied to the treatments which are operated in liquid as already mentioned and there has been no application wherein LIQUID is sprayed in the form of droplets or mist.

Therefore, the present invention offers new type of applications of LIQUID.

Based on the result of long term investigation and experience on the generation of micro bubbles and magnetic treatment for the purification of water, other embodiments of the present invention are;

Methods wherein LIQUID is produced in the form of droplets and/or mist by supplying LIQUID to proper sprayer of fogger.

Methods wherein the gas is air, oxygen, ozone, nitrogen, carbon dioxide of hydrogen, or mixture of these gases.

Methods wherein said droplet is of water and water containing dissolved matter.

According to the present invention, droplets and/or mist of new characteristics are produced and expected to be applied to sterilization, cleaning, fire extinguishment and plant processing by spraying liquid which contains micro bubbles treated magnetically.

Production method of micro bubbles in FIG. 1 is especially suited for the object of the present invention.

Any liquid and gas can be applied to the method disclosed by the present invention. Main gas to be used for the purpose of this invention may be air, oxygen, ozone, nitrogen, carbon dioxide and hydrogen from the practical view point.

As for spray, the connecting chamber 31 in FIGS. 1, 8, and 10 can be used by modifying it to be closed chamber connected with at least one sprayer having spray nozzle. If necessary, the nozzle is provided with the device utilizing ultrasonic waves and/or any other means to accelerate dispersion of the liquid.

According to this invention, it becomes possible to sterilize air spaces, wall surfaces, utensils and other objects by spraying water which includes minute ozone bubbles. It is usually necessary to isolate the object to be sterilized in a closed space and to introduce ozone gas into it. According to this invention, ozone is kept in liquid droplet in the form of minute bubbles and released slowly from the liquid droplet attached to the object to be sterilized and sterilization takes place only in the vicinity of the droplets. No ozone gas is released in air while water droplets are sprayed in open space. Therefore, spray of water droplets containing ozone bubbles does not give harmful effect to human body.

When the diameter of bubble is smaller than one micrometer, it is very stable and can be kept in droplet for a long period. LIQUID can be used for the storage of gas in safe.

The LIQUID (water) which contains nitrogen or carbon dioxide can be used to extinguish fire by spraying the water to fire source. The LIQUID can be sprayed more concentrated to the source with less contamination than the ordinary fire extinguishment which generates large bubbles. Effect of lowering temperature by water and of shielding by inactive gas is evident at the same time.

Although this invention is described with particular embodiments, it does not limit the scope of this invention to only the embodiments described.

What is claimed is:

1. Method to produce activated liquid which contains micro-gas bubbles by means of a pump and a rotor, a motor rotates the rotor and drives the pump, the rotor is installed inside a fixed tube having two ends and a cylindrical wall, at least one liquid inlet and at least one gas inlet is formed through the cylindrical wall of the said fixed tube near one of its ends, and at least one connecting chamber having an outlet is connected to the other end of the fixed tube, said method including the steps of:

pumping exterior liquid and gas into the fixed tube through the respective liquid and gas inlets;

mixing the liquid and gas by means of at least one stirrer to convert the liquid and gas into an activated liquid containing micro-gas bubbles;

passing the activated liquid containing micro-gas bubbles through a shearing path formed between zigzag shaped surfaces along circumferential and linear directions of a rotation axis on the inner surface of the said fixed tube and the outer surface of the said rotor, wherein the activated liquid containing micro-gas bubbles is magnetically treated with a plurality of permanent magnets provided on the outer surface of the rotor and a plurality of permanent magnets provided on the inner surface of the fixed tube; and directing far infrared radiation into the magnetically treated activated liquid containing micro-gas bubbles located in the shearing path with an annular activator substantially composed of far infrared emission materials, the annular activator being positioned at a location before the shearing path, wherein the annular activator causes molecular oscillation of the magnetically treated activated liquid containing micro-gas bubbles.

2. The method of claim 1, wherein the outer surface of the rotor comprises successively alternating protuberances and grooves and the plurality of magnets provided on the outer surface of the rotor are mounted in the grooves, wherein the inner surface of the fixed tube comprises successively alternating protuberances and grooves and the plurality of magnets provided on the inner surface of the fixed tube are mounted in the grooves, wherein the depth from the top surfaces of the protuberances to the magnets mounted in the grooves on the outer surface of the rotor is different from the depth from the top surfaces of the protuberances to the magnets mounted in the grooves on the inner surface of the fixed tube.

3. Method to produce activated liquid which contains micro-gas bubbles by means of a pump and a rotor, a motor rotates the rotor and drives the pump, the rotor is installed inside a fixed tube having two ends and a cylindrical wall, at least one liquid inlet and at least one gas inlet is formed through the cylindrical wall of the said fixed tube near one of its ends, and at least one connecting chamber having an outlet is connected to the other end of the fixed tube, said method including the steps of:

pumping exterior liquid and gas into the fixed tube through the respective liquid and gas inlets;

mixing the liquid and gas by means of at least one stirrer to convert the liquid and gas into an activated liquid containing micro-gas bubbles;

passing the activated liquid containing micro-gas bubbles through a shearing path formed between zigzag shaped surfaces along circumferential and linear directions of a rotation axis on the inner surface of the said fixed tube and the outer surface of the said rotor, the activated liquid containing micro-gas bubbles is magnetically treated with a plurality of permanent magnets provided on the outer surface of the rotor and a plurality of permanent magnets provided on the inner surface of the fixed tube, at least 30% of the permanent magnets located at the same axial position generate a repulsive magnetic field in the shearing path where the activated liquid containing micro-gas bubbles flows, the outer surface of the rotor comprises protuberances having a trapezoidal section, and the inner surface of the fixed tube comprises protuberances having a trapezoidal section; and directing far infrared radiation into the magnetically treated activated liquid containing micro-gas bubbles located in the shearing path with an annular activator substantially composed of far infrared emission materials, the annular activator being positioned at a location before the shearing path, wherein the annular activator causes molecular oscillation of the magnetically treated activated liquid containing micro-gas bubbles.

4. The method of claim 3, wherein the protuberances on the outer surface of the rotor forms successively alternating protuberances and grooves and the plurality of magnets provided on the outer surface of the rotor are mounted in the grooves, wherein the protuberances on the inner surface of the fixed tube creates successively alternating protuberances and grooves and the plurality of magnets provided on the inner surface of the fixed tube are mounted in the grooves, wherein the depth from the top surfaces of the protuberances to the magnets mounted in the grooves on the outer surface of the rotor is different from the depth from the top surfaces of the protuberances to the magnets mounted in the grooves on the inner surface of the fixed tube.

5. The method of claim 1 or 3, wherein water is supplied to the liquid inlet and gas is supplied to the gas inlet, the gas being selected from the group consisting of air, oxygen, hydrogen, ozone, nitrogen, carbon dioxide or a mixture thereof.

6. The method of claim 1 or 3, further comprising a sprayer with an inlet and a spay nozzle, wherein the outlet of the connecting chamber is connected to the inlet of the sprayer.

* * * * *